No. 646,075. Patented Mar. 27, 1900.
A. V. LACOMBE.
NOODLE CUTTER.
(Application filed June 29, 1899.)
(No Model.)
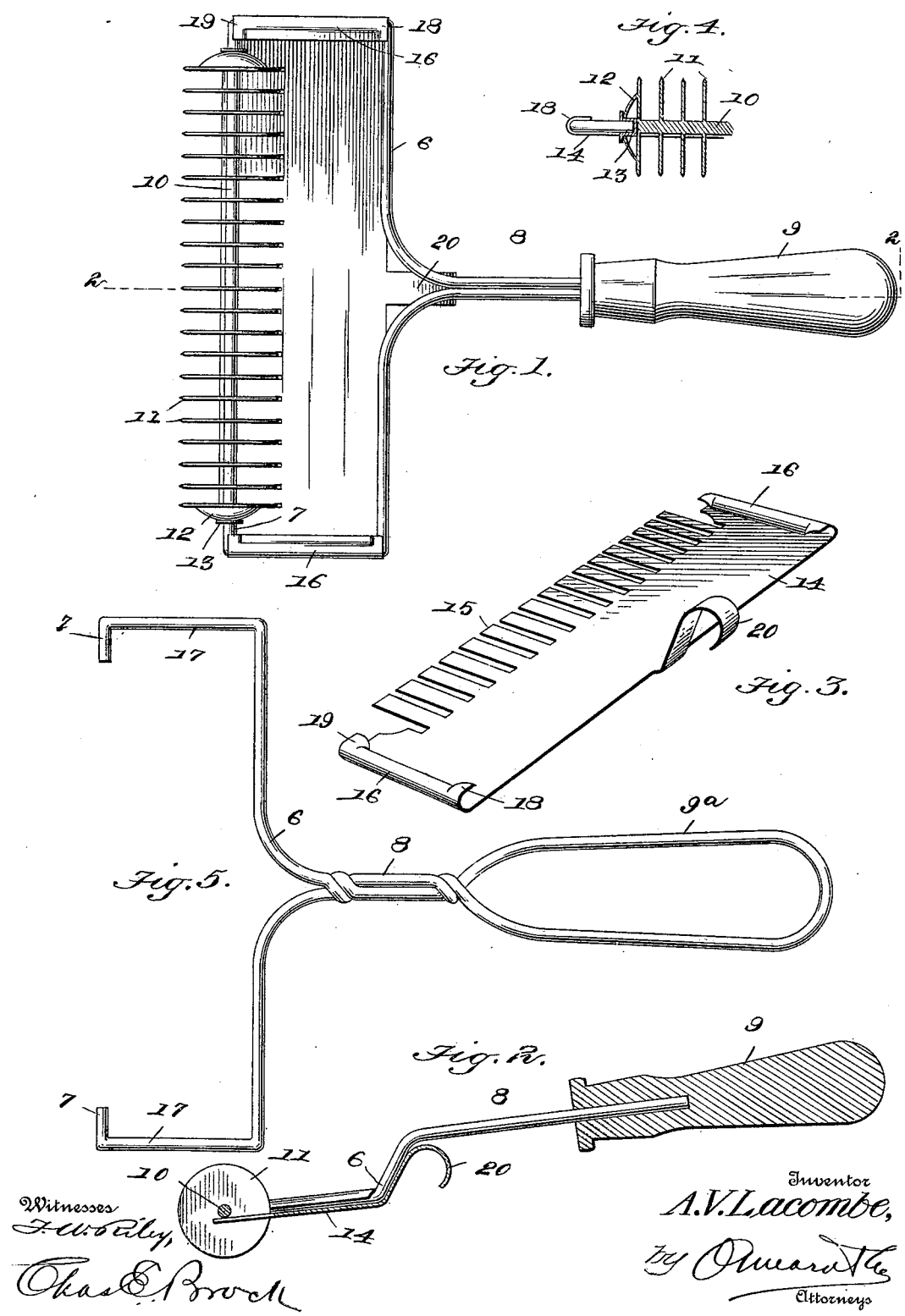
Witnesses
Inventor
A. V. Lacombe,
Attorneys

UNITED STATES PATENT OFFICE.

ALICE V. LACOMBE, OF LONGMONT, COLORADO.

NOODLE-CUTTER.

SPECIFICATION forming part of Letters Patent No. 646,075, dated March 27, 1900.

Application filed June 29, 1899. Serial No. 722,273. (No model.)

*To all whom it may concern:*

Be it known that I, ALICE V. LACOMBE, a citizen of the United States, residing at Longmont, in the county of Boulder and State of Colorado, have invented certain new and useful Improvements in Noodle-Cutters, of which the following is a specification.

My invention relates generally to kitchen articles, but more particularly to noodle-cutters, and has for its object to provide a device of the character described which will greatly facilitate the cutting of rolled dough into long even strips for the purpose of making noodles.

Another object is to construct such a device that the dough will not stick to the blades or disks, but will be cleaned therefrom as the disks are rotated.

Another object is to so construct the cleaner or guard that it can easily be removed from the frame in order that it may in turn be cleaned after the operation of cutting has been accomplished.

With these objects in view my invention consists of a substantially-rectangular frame, on which is mounted a transverse shaft carrying a plurality of disks alternately engaging a series of guard-teeth on a removable guard-plate positioned on the frame.

My invention further consists in the parts and combination of parts, as will be more fully set forth in the accompanying specification, illustrated in the drawings, and set up in the claims hereunto annexed.

In the drawings, Figure 1 is a top plan view of my invention ready for use. Fig. 2 is a longitudinal section on the line 2 2 of Fig. 1. Fig. 3 is a detail perspective of the guard or disk cleaner. Fig. 4 is a detail sectional view of the manner of securing the disk-carrying shaft to the frame, and Fig. 5 is a top plan view of a preferred form of handle and frame constructed of a single piece of wire.

Referring to the drawings by numerals, 6 indicates the main frame, comprising the substantially-rectangular portion, having a portion of its forward end cut away to form the engaging projections 7, to be hereinafter referred to. Intermediate the ends of the rear portion of this frame the wire extends a suitable distance to provide a shank 8, on which a handle 9 is secured.

10 is a longitudinal shaft carrying a series of circular disks 11, provided with cutting edges and positioned a predetermined distance apart—say about the width of an ordinary noodle. By reference to Fig. 4 it will be noticed that each end or outside disk is provided with an arbor 12, in which is fitted a suitable bearing 13, which is engaged by the projections 7 of the main frame.

14 is the guard-plate, the forward portion of which is provided with a plurality of outwardly-projecting teeth 15, spaced apart about the distance of the width of the disks, which are designed to fit snugly therebetween but have sufficient play to prevent any unnecessary friction. The ends of the plate will be cut out on the arc of a circle to accommodate the convex wall of the arbor 12 and the flange of the bearing 13. At each end of the guard-plate 14 I provide the return edges 16, which will be sprung over the ends 17 of the main frame, and thereby hold and retain the same in operative engagement. It will be noticed that these return edges are provided with shoulders 18 and 19, which abut against the forward and rearward portions of the main frame, whereby a lateral displacement of the plate will be prevented except when force is applied to the handle 20, when the same can be removed. When this plate 14 is secured on the frame 6, the projections 7 thereof will be positively locked in engagement with the disk-carrying rod or shaft and no amount of jarring can displace the parts; but as soon as the plate is removed all the parts can be removed or disconnected.

In actual practice I will quite likely find it of advantage to employ the construction of frame shown in Fig. 5, wherein the handle is integral with the frame, and I reserve the right to use the handle $9^a$ or coat it with any suitable material, such as hard rubber or the like, to form a cylindrical handle, but the form shown will be found to be the least expensive.

While I have shown the best means known to me for accomplishing the desired results, I would have it understood that I reserve the right to make such alterations and changes as might come within the scope of my invention and which might suggest themselves to the ordinary mechanic without departing from the spirit thereof.

Having thus fully described my invention, what I claim as new, and desire to secure by Letters Patent of the United States, is—

1. In a noodle-cutter, the combination with a main frame, of a revoluble shaft, carrying a series of cutting-disks, the arbor on the respective end disks in which are located bearings adapted to be engaged by said frame, a removable guard-plate adapted to lock said frame in engagement with the shaft and having forwardly-projecting teeth alternating with the said disks, substantially as described.

2. In a noodle-cutter, the combination with a substantially-rectangular main frame of a single piece of wire bent to form engaging ends at its forward end, of a revoluble shaft carrying a series of disks, arbors on the respective end disks in which are located bearings, adapted to be engaged by the engaging ends of the frame, a removable guard-plate locking said frame and shaft in operative engagement, substantially as described.

ALICE V. LACOMBE.

Witnesses:
CHARLES COLMAN,
CYRUS CHAPIN.